Dec. 21, 1943.  J. B. ARMITAGE  2,337,223
MACHINE TOOL TRANSMISSION AND CONTROL MECHANISM
Filed Sept. 3, 1937  3 Sheets-Sheet 2
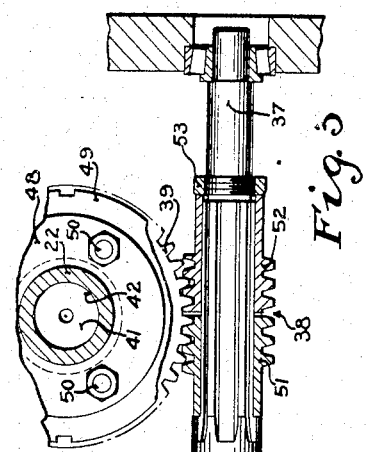
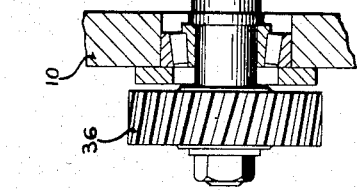
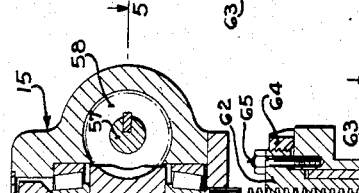
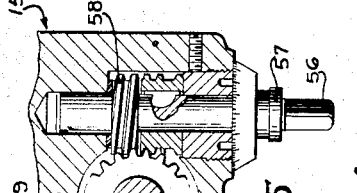
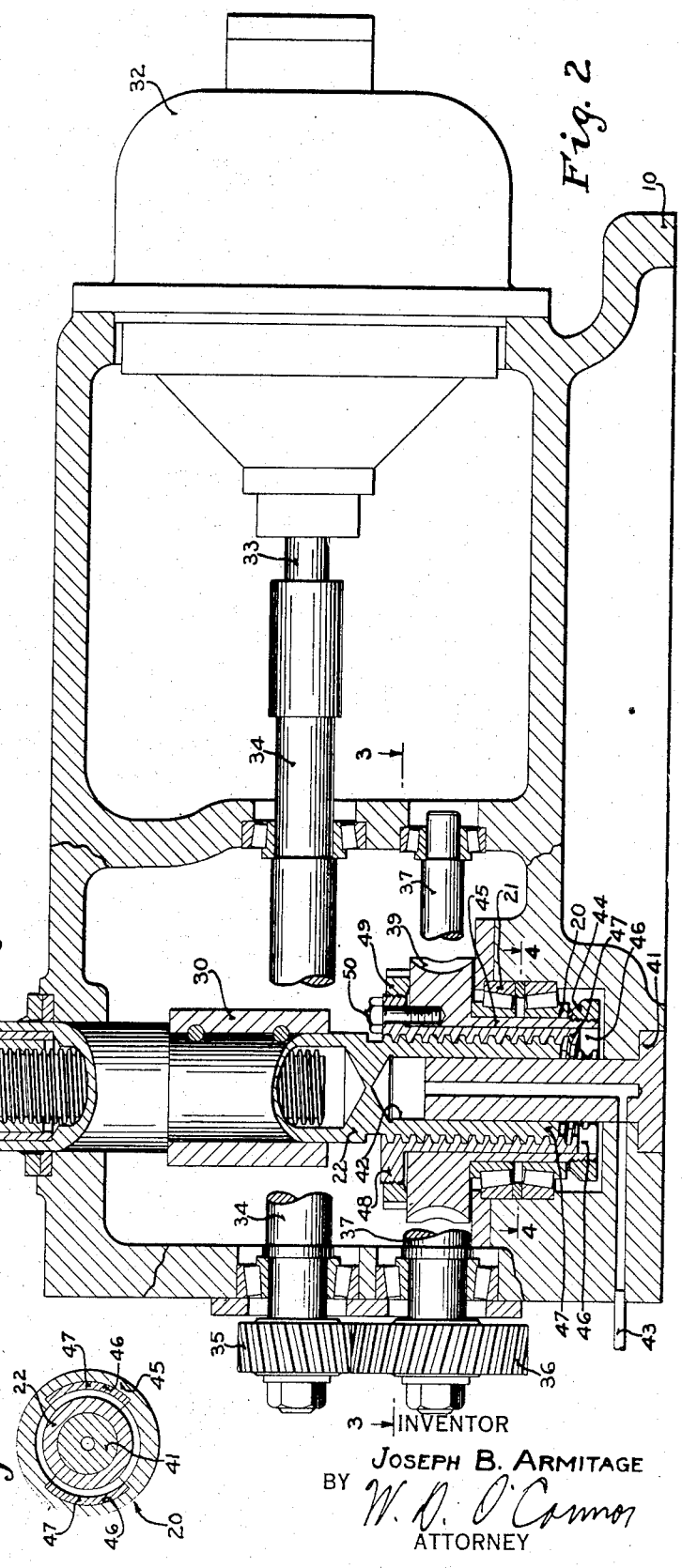
INVENTOR
JOSEPH B. ARMITAGE
BY W. D. O'Connor
ATTORNEY

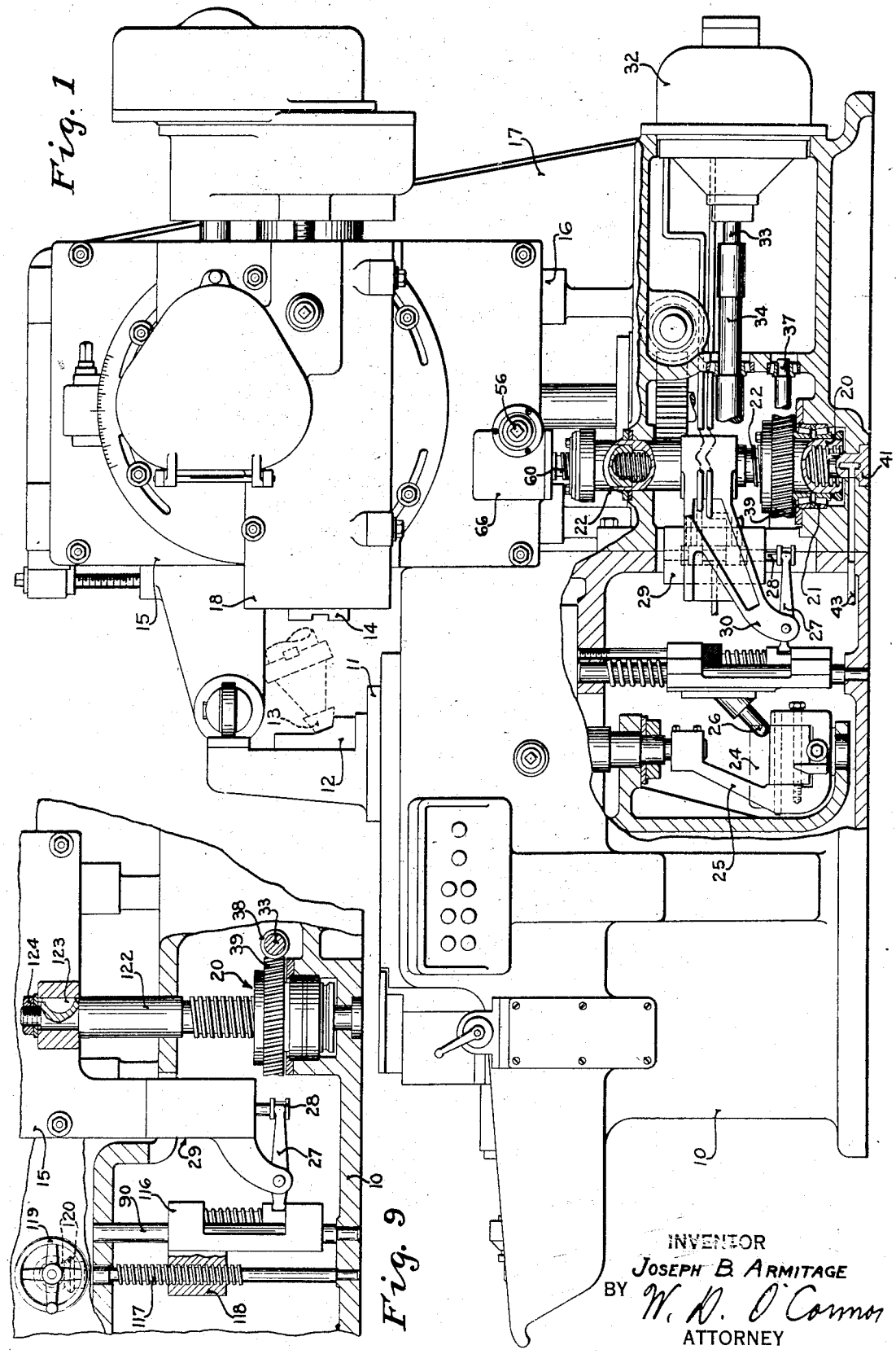

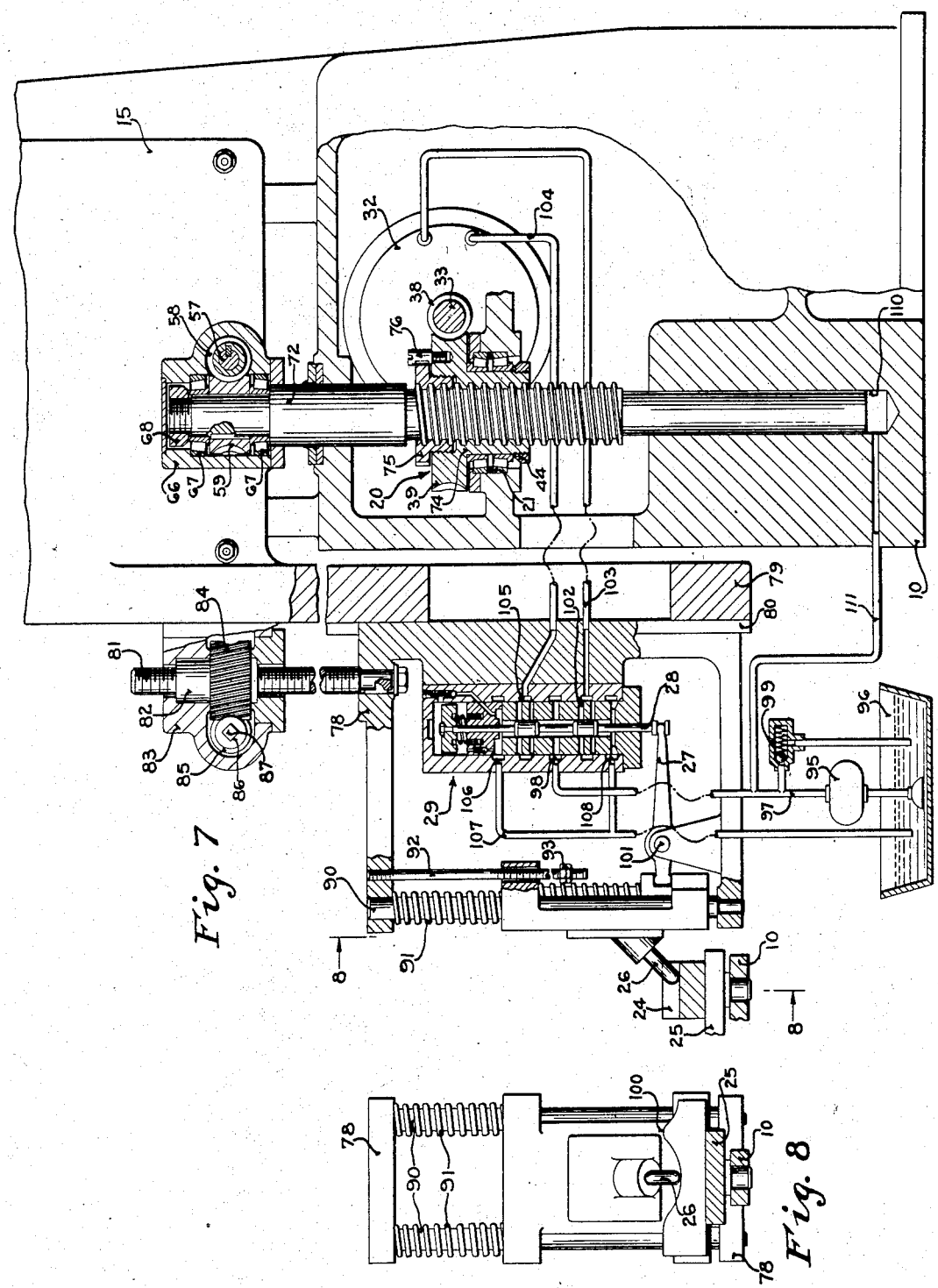

Patented Dec. 21, 1943

2,337,223

UNITED STATES PATENT OFFICE 2,337,223

MACHINE TOOL TRANSMISSION AND CONTROL MECHANISM

Joseph B. Armitage, Wauwatosa, Wis., assignor to Kearney & Trecker Corporation, West Allis, Wis., a corporation of Wisconsin Application September 3, 1937, Serial No. 162,284

13 Claims. (Cl. 90—16)

This invention relates generally to improved hydraulically actuated transmission and control mechanism for a machine tool, and more particularly to mechanism for effecting controlled movements of a machine tool element.

The present invention constitutes an improvement upon the mechanism disclosed in and covered by my co-pending application, Serial No. 47,345, filed October 30, 1935, and entitled "Machine tool," which issued May 9, 1939, as Patent No. 2,157,471.

A general object of this invention is to provide an improved hydraulically actuated machine tool transmission mechanism that is capable of effecting movement of a machine tool element in accordance with a predetermined pattern with a high degree of accuracy.

Another object of the invention is to provide hydraulically actuated mechanism capable of precisely controlling the movement of a machine tool element.

Another object is to provide a hydraulically actuated machine tool transmission mechanism capable of highly accurate response to cooperating control apparatus.

Another object is to provide an improved and simplified hydraulically actuated transmission mechanism for a machine tool.

Another object is to provide improved means for driving a linearly movable machine tool element by power derived from a rotary hydraulic motor.

A further object is to provide improved means for manually actuating a power driven machine tool element without disturbing the power driving connection thereto.

A further object is to provide mechanism for effecting movement of a machine tool element, which may be actuated from either one of two sources of energy without disturbing the connection with the other source.

A still further object is to provide an improved screw and nut actuating mechanism in which either the screw or the nut may be rotated to effect relative axial movement therebetween.

According to this invention, a movable member of a machine tool is caused to follow the contour of a template with a high degree of precision, the member being driven by means of an actuating mechanism including a rotary hydraulic servo-motor that is controlled in response to movement of a follower over the template. The necessary high degree of accuracy in reproducing the template is insured by so arranging the actuating mechanism as to prevent any lost motion in the driving train. To this end, the movable member is propelled by a screw and nut driving mechanism that is of the adjustable or anti-backlash type and that is mounted in tightly fitted bearings, whereby reversal in the direction of movement may be effected without lost motion. To further insure accuracy, the motor driven element of the screw and nut mechanism is rotated by means of an irreversible worm and worm wheel mechanism which is likewise made adjustable to obviate backlash. For moving the machine element manually, a second irreversible drive mechanism is arranged to turn the other element of the screw and nut mechanism. Since each element of the screw and nut mechanism has an irreversible driving connection associated with it, either element thereof may be turned without causing the other element to turn.

The foregoing and other objects of this invention, which will become more fully apparent from the following detailed description of structures constituting exemplary embodiments thereof, may be achieved by the mechanisms shown in and described in connection with the accompanying drawings, in which:

Figure 1 is a view in front elevation of a machine tool embodying the invention, parts of the machine frame having been broken away to better disclose the support moving transmission and control mechanism to which the specification is particularly directed;

Fig. 2 is an enlarged view, partly in vertical section, of the support moving transmission mechanism shown in Fig. 1 housed within the machine;

Fig. 3 is a detail view in horizontal section of part of the transmission mechanism showing the rotary nut and its driving gear, taken on the plane represented by the line 3—3 in Fig. 2;

Fig. 4 is a detail view in horizontal section of the adjusting mechanism within the driving nut, taken on the plane represented by the line 4—4 in Fig. 2;

Fig. 5 is a detail view in horizontal section of the manually actuated support moving mechanism, taken on the plane represented by the line 5—5 in Fig. 2;

Fig. 6 is a detail view in horizontal section of the adjusting mechanism within the nut constituting part of the manually actuated support moving mechanism, taken on the plane represented by the line 6—6 in Fig. 2;

Fig. 7 is a fragmentary partially diagrammatic sectional view, generally similar to Figs. 1 and 2, but illustrating a modified embodiment of the invention and showing the circuit of the hydraulic control system;

Fig. 8 is a view, partly in end elevation and partly in vertical section, showing the tracer and follower mechanism of the control system, taken on the plane represented by the line 8—8 in Fig. 7; and Fig. 9 is a fragmentary vertical sectional view, generally similar to Fig. 1, illustrating diagrammatically a further modification of the invention.

Referring more specifically to the drawings, and particularly to Fig. 1 thereof, the machine tool there illustrated as constituting a practical embodiment of the invention, is a milling machine of the type disclosed in and covered by my previously mentioned co-pending application, Serial No. 47,345. As more fully described in said co-pending application, the milling machine shown comprises essentially a base 10 which carries a work supporting member 11, arranged for angular movement in a horizontal plane, and for linear movement horizontally along either of two paths. A workpiece 12 may be mounted on the work supporting member 11 in position to be machined to a predetermined contour by a rotary cutter 13 mounted in a tool spindle 14 which is rotatably supported on a spindle carrying head 15. As shown, the spindle carrying head 15 is slidably mounted for vertical movement upon ways 16 formed on an upstanding column portion 17 of the machine base 10. The tool spindle 14 is rotatably supported on the head 15 by means of an axially and angularly adjustable quill mechanism 18, and it is arranged to be driven by appropriate mechanism fully described in the aforesaid co-pending application.

For moving the tool supporting head 15 vertically on the ways 16, there is provided an irreversible screw and nut support moving mechanism, as shown in Fig. 1. This mechanism comprises a nut 20 rotatably mounted in tightly fitted antifriction bearings 21 embedded in the base 10 in manner to support the nut rigidly, and a cooperating non-rotatable elevating screw 22 having threaded engagement with the nut 20 and connected to the spindle head 15 in manner to effect vertical movement thereof upon rotation of the nut. This vertical movement of the head 15 and of the cutting tool 13 relative to the workpiece 12 may be effected by power in manner to reproduce automatically the contour of a pattern or template 24 that is carried by a supporting bracket 25 depending from the work supporting member 11, the power driving means being controlled in accordance with movement of a slidably mounted follower member 26 which engages with and moves over the surface of the template. As shown, the follower 26 engages one end of a pivotally mounted lever 27, the other end of which engages and operates a plunger 28 of a control or follower valve 29, the lever 27 being pivoted on and carried by a bracket 30 which is secured to the non-rotatable elevating screw 22 and which also functions to carry the body of the follower valve.

The follower valve 29 is operatively connected to control a rotary hydraulic servo-motor 32 in the manner more fully set forth in my previously mentioned co-pending application, and outlined in the latter part of this specification in connection with the description of the control system shown in detail in Fig. 7.

As best shown in Fig. 2, the rotary hydraulic servo-motor 32 has a shaft 33 which is connected to a shaft 34 journaled horizontally in the base 10 of the machine, the shaft 34 having on its inner end a removably mounted gear wheel 35 which meshes with a gear wheel 36 removably mounted on the end of a shaft 37 disposed parallel with and below the shaft 34. As shown in Fig. 3, the lower shaft 37 carries a worm 38 which meshes with a worm wheel 39 formed integrally with part of the driving nut 20, the driving mechanism being irreversible and operative to effect rotation of the nut 20 in its bearings 21 when the hydraulic motor 32 is actuated.

As explained in my co-pending application, the hydraulic motor 32 is reversible and is arranged to operate in one direction or the other to raise or lower the tool supporting head 15 automatically in accordance with the contour of the pattern 24. To assist in raising the work support and thereby to improve the accuracy of response of the servo-motor mechanism, the elevating screw 22 is provided with a hydraulic counter-balancing mechanism constituted by a stationary upstanding piston 41 cooperating with a bore 42 in the lower end of the screw 22 and connected by a conduit 43 to the source of fluid pressure for actuating the servo-motor.

To insure a high degree of accuracy in moving the cutter relative to the workpiece in conformity with the contour of the pattern, particularly when the direction of movement changes because of reversal in direction of movement of the follower 26, means are provided for obviating all lost motion in the driving train connecting the servo-motor 32 to the vertically movable tool supporting head 15. To this end, the anti-friction bearings 21 supporting the rotatable driving nut 20 are of adjustable type, being provided with an adjusting ring nut 44 threaded on the exterior of the driving nut 20 and engaging the bearings to tighten them. Likewise, the rotatable nut 20 is of the adjustable or anti-backlash type, the adjusting mechanism being arranged to obviate lost motion between the threads of the nut and the cooperating threads of the screw 22. As may best be seen in Figs. 2, 3, and 4, the nut 20 includes a body portion 45, having the worm wheel 39 formed integrally therewith, the inner surface of the body being threaded and being provided at opposite sides with axially disposed grooves or cut-away openings 46. The openings 46 receive diammetrically disposed depending threaded segments 47 of an adjusting collar 48, the arrangement being such that axial movement of the collar 48 relative to the body portion 45 will cause the threads of the segments 47 to closely engage one side of the threads of the screw 22 while the threads of the body portion 45 will closely engage the other side of the threads of the screw. Axial movement of the adjusting collar 48 may be effected by turning a ring nut 49 having threaded engagement with the periphery of the collar and bearing upon the end of the body portion 45 of the nut. Upon turning the ring nut 49 in direction to move the adjusting collar 48 upward relative to the body portion 45, the threads of the segments and of the body of the nut 20 are brought into close engagement with the opposite sides of the threads of the screw 22 in manner to prevent endwise lost motion between the screw and the nut. A locking stud bolt 50 is provided for locking the adjusting collar to the nut body after adjustment has been effected.

With the nut 20 thus rigidly supported in the frame 10 and closely engaging the screw 22, any rotational movement imparted to the nut effects a corresponding vertical movement of the screw 22 and of the cutter-carrying head 15 regardless of changes in the forces acting upon the cutting head or of change in direction of rotation of the rotatable nut, the action taking place without lost motion and in manner to effect rigid, irreversible support of the cutting head in the position to which it is moved by operation of the servo-motor 32.

As a further precaution against lost motion in the driving mechanism, the worm 38 which engages the worm wheel 39 on the rotatable nut is divided transversely, as shown in Fig. 3, into two parts 51 and 52, which are splined on the shaft 37, the part 52 being movable toward the part 51 by means of a nut 53 threaded on the shaft 37. By tightening the nut 53, the threads of the two parts of the worm are caused to closely engage opposite sides of the teeth of the worm wheel 39 for obviating lost motion therebetween in accordance with the invention protected by Patent No. 2,002,644 issued May 28, 1935, to Walter M. Pohl, and entitled "Adjustable worm gearing."

By this arrangement, rotary movement of the servomotor 32 in either direction, and particularly reversals in the direction of rotation, are transmitted without lost motion, to cause vertical movement of the cutter supporting head 15, whereby the rotary cutter 13 may be moved relative to the workpiece 12 precisely in accordance with the contour of the pattern 24. If it is desired to change the ratio of the rate of movement of the cutter head 15 to the speed of rotation of the hydraulic motor shaft 33, it is merely necessary to remove the gears 35 and 36, Fig. 2, from the ends of the shafts 34 and 37 respectively and to substitute for them another pair of gears of such ratio as to provide the desired rate of movement of the cutter head.

In order to move the cutter head 15 manually to position the tool for initiating a cutting operation without disturbing the relationship of the follower 26 and the servomotor driving mechanism with the pattern 24, a suitable crank (not shown) may be applied to a squared end 56 of an operating shaft 57 projecting at the front of the head, as shown in Fig. 1. Referring to Figs. 2, 5, and 6, it will be seen that the operating shaft 57 carries a worm 58 which meshes with a worm wheel 59 secured on a screw threaded adjusting shaft 60 having threaded engagement with internal threads 61 in the upper end of the elevating screw 22. Rotation of the operating shaft 57 causes the threaded shaft 60 to turn within the internal threads 61 of the driving screw and thereby causes the tool head 15 to move vertically relative to the machine base and relative to the elevating screw 22 and the follower mechanism carried thereby. By this means, a cutter 13 may be positioned to start a cut on a workpiece 12 at any predetermined position relative to the pattern 24.

To obviate lost motion between the threaded shaft 60 and the elevating screw 22, the upper end of the screw 22 is provided with an adjusting collar 62, Figs. 2 and 6, having depending threaded segments 63 slidably mounted in axial openings in the inner surface of the threaded portion 61 of the elevating screw, the arrangement being similar to that in the adjustable driving nut 20. An adjusting ring nut 64 engages the periphery of the collar 62 for moving it axially relative to the elevating screw 22, and locking bolts 65 are provided for retaining the collar in adjusted position. The worm 58 and worm wheel 59 of the hand adjusting mechanism are of the self-locking or irreversible type and function to retain the adjusting screw 60 in any position to which it may be turned by the hand crank without necessitating auxiliary locking means, and without danger of accidental movement.

To effect rigid connection between the adjusting screw 60 and the tool supporting head 15, the upper end of the screw 60 is journaled in a bracket 66 projecting from the head 15, by means of adjustable anti-friction bearings 67 disposed at opposite sides of the worm wheel 59 and held rigidly in adjusted position by a lock nut 68 in manner to obviate lost motion between the elevating screw and the spindle supporting head. As a further guard against lost motion, the worm 58 is of the adjustable type, as may be seen in Fig. 5, in order that it may be tightened into close engagement with the worm wheel 59.

In the modification of the invention, illustrated in Figs. 7 and 8, the manually operated adjusting means acts directly upon a modified elevating screw 72 in manner to turn it within the driving nut 20 for effecting vertical movement of the tool supporting head 15. As shown, the worm wheel 59 is secured directly on the upper end of the elevating screw 72, the screw being rotatably mounted in the bracket 66 by the two anti-friction bearings 67 in the same manner as the adjusting screw 60, shown in Fig. 2, is supported. Since the manually operated worm 58 and worm wheel 59 constitute an irreversible or self-locking drive mechanism, the upper end of the elevating screw 72 remains fixed relative to the head 15 unless the worm 58 is turned by manually actuating the shaft 57. At all other times the worm wheel 59 and worm 58, together with the bearings 67, constitute a rigid connection between the elevating screw 72 and the head 15, whereby movement of the head by means of the power driven nut 20 may be effected without lost motion between the elevating screw and the head.

Since the worm wheel 39 on the driving nut 20 and its meshing worm 38 also constitute an irreversible drive mechanism, the nut 20 is restrained from participating in the rotary movement when the elevating screw 72 is actuated manually, by turning the operating shaft 57, to turn the screw within the nut. Consequently the tool supporting head 15 may be moved either by turning the screw 72 manually or by turning the nut 20 by power, each operation being entirely independent of the other and without special means being required to lock either of the members in stationary position while the other is being turned.

In this modification, the driving nut 20 is provided with a different arrangement for effecting adjustment of its threads relative to the threads of the elevating screw 72. As shown, the nut comprises a body portion 74 provided with internal threads meshing with the threads of the screw 72 and having in its upper end a counterbored internally threaded opening for receiving an adjusting collar 75. The adjusting collar 75 is threaded internally to mesh with the elevating screw 72 and has external threads of different pitch which engage the internal threads of the counterbored opening in the body portion 74. By turning the adjusting collar 75 within the body portion 74, the differential action of the external and internal threads causes one side of the threads in the collar to bear against one side of the threads of the elevating screw 72 and to force the other side of the threads on the elevating screw into engagement with the threads in the body portion 74, in manner to effect close engagement between the threads of the nut 20 and the threads of the elevating screw 72, thereby preventing endwise lost motion between the screw and the nut. To insure that the adjustment of the nut 20 will be maintained, a locking screw 76 is provided for engaging a notch in the periphery of the nut to prevent movement thereof. As a further modification of the mechanism, the adjustable driving worm 38 meshing with the worm wheel 39 on the nut may be mounted on or directly connected to the shaft 33 of the rotary hydraulic motor 32, as shown in Fig. 7.

Since in the modification of the invention shown in Figs. 7 and 8, the elevating screw 72 moves with the tool supporting head 15 at all times, it is desirable that the follower and the servo-motor valve mechanism be adjustably mounted on the movable head, a supporting bracket 78 being slidably mounted on an apron 79 depending from the head 15 for that purpose. As shown, the bracket 78 is slidably mounted for vertical movement in ways 80 on the apron 79, and has attached to its upper end an adjusting screw 81 having threaded engagement with a nut 82 that is rotatably mounted in a bracket 83 projecting from the head 15. The nut 82 is provided with a worm wheel portion 84 that is engaged by an adjustable worm 85 which may be turned manually by means of a suitable crank applied to a squared end 86 of an operating shaft 87 extending forwardly from the worm in the bracket.

As shown in Figs. 7 and 8, the follower 26 is mounted for vertical sliding movement on the bracket 78 by means of a pair of guide rods 90 and it is forced downward into engagement with the pattern 24 by springs 91 encircling the rods, a restraining bolt 92 having lock nuts 93 being provided for adjustably limiting the downward movement of the follower.

In starting to cut a workpiece in accordance with the pattern 24, the tool supporting head 15 may be adjusted to bring the cutting tool into cooperating relationship with the workpiece by turning the elevating screw 72 manually by means of the operating shaft 57 and the associated worm and worm wheel. After the cutting tool has been positioned, the follower 26 is moved into cooperating relationship with the pattern 24 by turning the actuating shaft 87 to rotate the nut 82 on the screw 81 for raising or lowering the bracket 78 which carries the tracer and the control valve mechanism. Power is then applied to rotate the cutting tool and to effect horizontal feeding movements of the workpiece and the pattern relative to the cutting tool and the follower respectively.

Fluid under pressure for actuating the rotary hydraulic motor 32 in response to the pattern and follower control mechanism, is derived from a pump 95 which draws oil from a sump 96 and forces it through a tube 97 to a central pressure port 98 in the valve 29, a pressure relief valve 99 being provided to relieve excessive pressure in the system. The control system shown in Fig. 7 is similar to that shown partially in Fig. 1, and the operation is substantially the same. For example, if the follower 26 is moved upwardly by reason of engagement therewith by a raised portion 100 on the pattern 24, as shown in Fig. 8, the springs 91 are compressed and the pivoted lever 27 is turned clockwise about a supporting pivot pin 101 carried by the bracket 78, thereby moving the valve plunger 28 downward within the valve casing 29. This results in establishing communication between the pressure port 98 and a port 102 leading to a conduit 103, which conducts the fluid under pressure to the rotary hydraulic motor 32 for actuating it in direction to move the tool supporting head 15 upward, the fluid being exhausted from the motor 32 through a conduit 104 leading to a port 105 in the valve 29 that is in communication with an exhaust port 106 from which an exhaust conduit 107 leads to the sump 96.

As the tool supporting head 15 moves upward, it carries with it the bracket 78 and the valve casing 29 mounted thereon, but since the follower 26 remains in contact with the pattern 24 by reason of the fact that it is slidably mounted on the rods 90 and urged downwardly by the spring 91, the upward movement of the bracket causes the pivoted lever 27 to turn in manner to exert a controlling action upon the valve stem 28, thereby regulating the speed of the motor 32 in accordance with the slope of the pattern surface in a manner to effect accurate duplication of the pattern in the workpiece.

When the follower 26 arrives at the top of the elevation 100, its upward movement ceases and the continued upward movement of the head 15 and the associated bracket 78 causes the lever 27 to pivot counter-clockwise to the horizontal position shown, thereby moving the valve plunger 28 to neutral position, closing the port 102, and stopping the servo-motor 32. As the follower 26 continues over the elevation 100 on the pattern and starts down the other side thereof, it causes the pivoted arm 27 to be turned further in the counter-clockwise direction, thereby moving the valve piston 28 upward and establishing communication from the pressure port 98 to the port 105. The pressure fluid then flows through the port 105 into the conduit 104 and enters the motor 32 in manner to operate it in the other direction, the exhaust from the motor flowing through the conduit 103, and the valve port 102, which now communicates with an exhaust port 108 also connected with the exhaust conduit 107.

The valve 29 is so arranged that very slight movement of the plunger 28 in either direction from its neutral position permits flow of pressure fluid to the motor for turning it in the one or the other direction. To overcome the weight of the tool supporting head 15 and thereby provide for equally accurate response in either direction to the pattern and follower control mechanism, a hydraulic counter-balance mechanism is provided. As shown, the lower part of the elevating screw 72 constitutes a piston fitting within a cylinder 110 formed in the base 10 of the machine. Fluid under pressure from the pump 95 is conducted from the tube 97 through a conduit 111 to the bottom of the cylinder 110 and exerts pressure therein upon the lower end of the elevating screw 72 in manner to counter-balance the weight of the apparatus carried by the screw.

By reason of the closely adjusted driving connections between the motor 32 and the rotatable nut 20, the anti-backlash engagement of the nut with the elevating screw 72, and the tightly fitted bearings, a reversal in the direction of rotation of the motor 32 results in an immediate reversal in the direction of movement of the tool supporting head 15, thereby moving the cutting tool in exact conformity with the contour of the pattern 24.

In positioning the tool supporting head 15 to start a cut on a workpiece, it is sometimes more convenient to utilize the power of the hydraulic motor 32 in moving the head, particularly if it is to be moved some distance. This may be accomplished by first moving the follower 26 into cooperating relationship with the pattern 24 and then starting the pump 95 to energize the hydraulic system. The actuating shaft 87 may then be turned manually to move the bracket 78 and the associated follower valve mechanism relative to the head 15 to effect control of the motor 32. For example, if it is desired to elevate the head 15, the shaft 87 is turned in direction tending to move the bracket 78 downward, whereupon the servo-motor responds to restore the bracket to its original position, thereby lifting the head. In this manner, power movement of the head in either direction may be effected merely by turning the control actuating shaft 87.

Power movement of the head 15 may be accomplished in similar manner in a machine in which the pattern and follower mechanism is not utilized. As shown in Fig. 9, the follower 26 may be replaced by a sliding block 116 of generally similar shape mounted for vertical movement on the guide rods 90 and arranged to be actuated manually by means of a screw 117 instead of by a pattern. The screw 117 is journaled vertically in the machine frame 10 and engages a nut 118 on the block 116 in such manner that rotation of the screw results in vertical movement of the block. As in the previously described mechanisms, vertical movement of the sliding block 116 causes the pivoted lever 27 to actuate the valve plunger 28 in manner to cause the hydraulic servo-motor to move the head 15 in direction to restore the lever 27 to horizontal position. As shown in Fig. 9, the screw 117 may be actuated by means of a small handwheel 119 rotatably mounted on the front of the machine and operatively connected to the screw by bevel gears 120. Since the head 15 may be moved readily in either direction by power by merely turning the small handwheel 119 in the proper direction, it is not necessary to provide other means for manually adjusting the head. Accordingly a modified plain elevating screw 122 is utilized which is rigidly connected at its upper end to the head 15 by means of a key 123 and a nut 124. Further, the hydraulic counterbalance mechanism has likewise been dispensed with in this structure.

Although only a few particular embodiments of the invention have been shown and described in detail as illustrative of apparatus operating in accordance therewith, it is to be understood that various other modifications of the invention may be devised in utilizing the principles herein set forth, without departing from the spirit and scope of the invention as defined in the subjoined claims.

I claim as my invention:

1. In a machine tool, the combination with a base and a member movable relative to said base, of a screw rotatably mounted in said movable member, a driving nut rotatably mounted in said base and disposed in threaded engagement with said screw, said nut being of the anti-backlash type to prevent lost motion relative to said screw, an irreversible drive mechanism in said base operatively connected to turn said nut in manner to exert axial force on said screw for moving said movable member, a manually operable irreversible drive mechanism carried by said movable member operatively connected to turn said screw in said nut in manner to move said movable member relative to said base, said irreversible drive mechanisms serving to prevent rotation of said nut by said screw or rotation of said screw by said nut, a rotary fluid motor operatively connected to actuate the irreversible drive mechanism associated with said rotatably mounted nut for moving said movable member relative to said base by power, and control apparatus arranged to effect actuation of said motor in either direction selectively, said screw and nut mechanism being capable of precisely positioning said movable member in response to actuation of said control apparatus.

2. In a machine tool transmission mechanism, the combination with a vertically movable machine element, of a pump arranged to furnish fluid under pressure, a piston and cylinder mechanism disposed to be actuated by pressure fluid from said pump and operative to counter-balance the weight of said movable element, a screw and nut mechanism disposed to actuate said movable element vertically, said mechanism being of the anti-backlash type to obviate lost motion, a rotary fluid motor operatively connected to actuate said screw and nut mechanism, and control apparatus operative to admit pressure fluid from said pump to said motor in manner to actuate said motor in either direction selectively, said transmission mechanism being capable of accurately positioning said movable element in either direction of movement in response to said control apparatus.

3. In a machine tool, the combination with a movable member, of means for moving said member including a screw and nut mechanism, said mechanism having a take-up nut comprising an internally threaded body having axially disposed internal grooves, an adjusting collar having extending internally threaded segments disposed for axial sliding movement within said grooves of said nut body, and means for effecting axial adjustment of said adjusting collar relative to said nut body to cause the threads of said segments to engage one side of the threads of the screw while the threads of the body engage the other side of the threads of the screw.

4. In a screw and nut mechanism, the combination with a threaded screw, of a take-up nut comprising a body having internal threads adapted to cooperate with said screw and having an axially disposed internal groove, a segment presenting internal threads adapted to cooperate with said screw and arranged for axial sliding movement in said internal groove, and means for effecting axial adjustment of said segment relative to said nut body, whereby the threads of said segment may be forced into engagement with one side of the threads of said screw in manner to force the other side of said screw threads into engagement with the threads of said nut body.

5. In a screw and nut mechanism, the combination with a threaded screw, of a take-up nut comprising a body portion having internal threads adapted to cooperate with said screw and having a pair of diametrically opposed axially disposed internal grooves, an adjusting collar having a pair of axially extending internally threaded segments disposed for axial sliding movement within said grooves and cooperating with said screw, and means for adjusting the axial position of said adjusting collar relative to said nut body, whereby the threads of said segments may be forced into tight engagement with one side of the threads of said screw and the threads of said nut body forced into tight engagement with the other side of the threads of said screw.

6. In a machine tool the combination of a pair of relatively movable supports, relative positioning means for said supports including two pairs of threadedly engaged relatively rotatable screw and nut elements, a reversible power train for relative rotation of one pair of said screw and nut elements in either direction, a manual train for relative rotation of the other pair of said screw and nut elements in either direction, and a plurality of lost motion eliminating means respectively operative between the engaged threads of the screw and nut elements of the different pairs, said plurality of lost motion eliminating means mutually cooperating to effect accurate positioning of said supports from either of said trains or in part from one train and in part from the other train.

7. In a machine tool the combination of a pair of relatively movable supports, relative positioning means for said supports including two pairs of threadedly engaged relatively rotatable screw and nut elements, a reversible power train for relative rotation of one pair of said screw and nut elements in either direction, a manual train for relative rotation of the other pair of said screw and nut elements in either direction, and a plurality of lost motion eliminating means respectively operative between the engaged threads of the screw and nut elements of the different pairs, each of said trains including a reversible direction driving device preventing reversal of power drive through the train, said driving devices and lost motion eliminating devices collectively mutually cooperating to effect accurate positioning of said supports from either of said trains or in part from one train and in part from the other train.

8. In a machine tool the combination of a pair of relatively movable supports, relative positioning means for said supports including relatively rotatable screw and nut means, a power train for effecting said relative rotation for either direction of said support movement including in the order recited a pump, shiftable reverser valve means, a reversibly rotatable hydraulic motor and said screw and nut means, and a shiftable controller member for positioning said reverser valve means, said reverser valve means being constructed for forward and reverse positions thereof to be substantially immediately adjacent one another and for a position intermediate therebetween to close the outlet fluid passageway of said motor whereby to prevent relative movement of said supports in the corresponding intermediate position of said controller member.

9. In a machine tool the combination of a pair of relatively movable supports, relative positioning means for said supports including relatively rotatable screw and nut means, a power train for effecting said relative rotation for either direction of said support movement including in the order recited a pump, shiftable reverser valve means, a reversibly rotatable hydraulic motor and said screw and nut means, and a shiftable controller member for positioning said reverser valve means, said reverser valve means being constructed for forward and reverse positions thereof to be substantially immediately adjacent one another and for a position intermediate therebetween to close the outlet fluid passageway of said motor whereby to prevent relative movement of said supports in the corresponding intermediate position of said controller member, and other means mutually cooperative with said valve means to prevent relative movement of said supports in said intermediate controller positions including lost motion eliminating means operative between engaged screw and nut elements of said screw and nut means.

10. In a machine tool the combination of a pair of relatively movable supports, relative positioning means for said supports including relatively rotatable screw and nut means, a power train for effecting said relative rotation for either direction of support movement including in the order recited a pump, shiftable reverser valve means, and a reversibly rotatable hydraulic motor, said reverser valve means being constructed for forward and reverse positions thereof to be substantially immediately adjacent one another and for a position intermediate therebetween to close the outlet fluid passageway of said motor, a manual train for effecting said relative rotation for either direction of support movement, and a reversible direction driving device in one of said trains and adapted to prevent reverse transmission of power through its train, said reverser construction and driving device mutually cooperating to effect accurate positioning of said support either from said motor or manual train or in part from said motor and in part from said manual train.

11. A machine tool as recited in claim 8 in which the relative movement of the supports is vertical, and including hydraulic counterbalance means for the vertically movable support.

12. In a machine tool the combination of a pair of relatively movable supports, screw and nut means for the relative movement of said supports, a plurality of trains each individually operable for actuation of said screw and nut means whereby to effect said support relative movement; each of said trains including in the order recited a reversibly rotatable driver member, a driving device including driving and driven elements operative to prevent reversal of power transmission therethrough and a portion of said screw and nut means, the driver members of the different trains being interconnected through said trains and the screw and nut means and the driving device of each train operative to prevent the driver member of the corresponding train from being actuated from the driver member of the other train, each of said trains including two lost motion eliminating means respectively operative to eliminate lost motion between said driving and driven elements of the driving device of the corresponding train and to eliminate lost motion between train elements driven through the driver device, said lost motion devices and driving devices collectively operating to prevent actuation of the one driver member from the other and to eliminate lost motion between the driver members of the different trains.

13. A machine tool as recited in claim 12 in which said screw and nut means includes two pairs of engaged screw and nut elements respectively in the different trains, one of the lost motion eliminating means of each train being operative to eliminate the lost motion between the screw and nut elements of the corresponding train.

JOSEPH B. ARMITAGE.